United States Patent
Bennett (10) Patent No.: US 7,609,837 B2
(45) Date of Patent: Oct. 27, 2009

(54) SYSTEM AND METHOD FOR AUTOMATIC SETUP OF A NETWORK DEVICE WITH SECURE NETWORK TRANSMISSION OF SETUP PARAMETERS

(75) Inventor: Richard T. Bennett, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 853 days.

(21) Appl. No.: 11/217,762

(22) Filed: Sep. 1, 2005

(65) Prior Publication Data

US 2007/0061575 A1 Mar. 15, 2007

(51) Int. Cl.
*H04L 9/08* (2006.01)
*H04L 9/12* (2006.01)
(52) U.S. Cl. .................. 380/262; 380/33; 380/273; 713/153; 713/162; 713/171; 726/29
(58) Field of Classification Search .................. None
See application file for complete search history.

(56) References Cited

U.S. PATENT DOCUMENTS

| 5,189,287 | A | | 2/1993 | Parienti |
| 5,768,381 | A | * | 6/1998 | Hawthorne ................. 380/284 |
| 5,982,520 | A | | 11/1999 | Weiser et al. |
| 6,088,143 | A | | 7/2000 | Bang |
| 6,219,164 | B1 | | 4/2001 | Morgaine |
| 6,457,069 | B1 | | 9/2002 | Stanley |
| 6,609,199 | B1 | | 8/2003 | DeTreville |
| 6,928,295 | B2 | * | 8/2005 | Olson et al. ................. 455/522 |

(Continued)

FOREIGN PATENT DOCUMENTS

BE 1013866 10/2002

(Continued)

OTHER PUBLICATIONS

Airlogic Co. Ltd., Korea, web page advertisement and specification sheet for Airmate Bluetooth USB Dongle with Flash Memory, Nov. 2003 (www.airlogic.co.kr).

(Continued)

*Primary Examiner*—William R Korzuch
*Assistant Examiner*—Michael R Vaughan
(74) *Attorney, Agent, or Firm*—Thomas R. Berthold (57) ABSTRACT

A system and method for use with local area networks (LANs) automatically configures a new device on a LAN by secure encrypted transmission of setup parameters. A remote control (RC) with an infrared (IR) transmitter contains a stored setup command and a security number that is used only once (a "nonce"). Setup of a new device is initiated by pressing a "setup" button on the RC which generates the security number and transmits it and the setup command to the new device via IR. The new device receives the setup command and security number and queries the network for the setup parameters. The RC also transmits the security number via IR to a network member device that contains the setup parameters. The network member uses the security number as an encryption key to encrypt the setup parameters and transmit them over the network. The new device uses the security number as the decryption key to decrypt the transmitted setup parameters.

17 Claims, 5 Drawing Sheets

U.S. PATENT DOCUMENTS

| | | | |
|---|---|---|---|
| 6,993,134 B1* | 1/2006 | Epstein | 380/262 |
| 2001/0055395 A1* | 12/2001 | Vogler | 380/273 |
| 2002/0023179 A1 | 2/2002 | Stanley | |
| 2002/0048368 A1* | 4/2002 | Gardner | 380/277 |
| 2002/0077077 A1 | 6/2002 | Rezvani et al. | |
| 2002/0099665 A1 | 7/2002 | Burger | |
| 2003/0079000 A1* | 4/2003 | Chamberlain | 709/220 |
| 2003/0158960 A1 | 8/2003 | Engberg | |
| 2003/0163622 A1 | 8/2003 | Moran | |
| 2003/0212802 A1 | 11/2003 | Rector | |
| 2004/0060977 A1* | 4/2004 | Proennecke | 235/375 |
| 2004/0076300 A1 | 4/2004 | Ishidoshiro | |
| 2004/0120297 A1 | 6/2004 | McDonnell | |
| 2004/0203590 A1 | 10/2004 | Shteyn | |
| 2006/0039339 A1* | 2/2006 | Cohen | 370/338 |
| 2006/0047960 A1* | 3/2006 | Ono et al. | 713/171 |
| 2006/0112280 A1* | 5/2006 | Cohen et al. | 713/186 |
| 2006/0185013 A1* | 8/2006 | Oyama et al. | 726/21 |
| 2006/0251256 A1* | 11/2006 | Asokan et al. | 380/270 |
| 2007/0003062 A1* | 1/2007 | Mizikovsky et al. | 380/270 |
| 2007/0025554 A1* | 2/2007 | Ong | 380/278 |
| 2007/0079113 A1* | 4/2007 | Kulkarni et al. | 713/150 |
| 2007/0160201 A1* | 7/2007 | Blom et al. | 380/30 |
| 2008/0080713 A1* | 4/2008 | Cho et al. | 380/273 |

FOREIGN PATENT DOCUMENTS

| | | | |
|---|---|---|---|
| EP | 0268972 | | 6/1998 |
| EP | 1024626 A1 | | 8/2000 |
| FR | 2700033 | | 7/1994 |
| GB | 2139047 A | | 10/1984 |
| IE | 20000729 | | 4/2001 |
| JP | 07095667 A | * | 4/1995 |
| WO | WO9820684 A2 | | 5/1998 |
| WO | WO 9843427 A1 | * | 10/1998 |
| WO | WO0111878 A1 | | 2/2001 |
| WO | WO2004089029 A1 | | 10/2004 |

OTHER PUBLICATIONS

AirStation One-Touch Secure System (AOSS™) "A Description of WLAN Security Challenges and Potential Solutions", Buffalo Technology, Inc., Oct. 2004 (www.buffalotech.com).

* cited by examiner

SYSTEM AND METHOD FOR AUTOMATIC SETUP OF A NETWORK DEVICE WITH SECURE NETWORK TRANSMISSION OF SETUP PARAMETERS

BACKGROUND OF THE INVENTION

1. Field of the Invention

This invention relates generally to local area networks (LANs), and more particularly to a system and method for automatic configuration of a new device on a LAN by secure network transmission of configuration parameters, including a shared network security key.

2. Description of the Related Art

LANs are in widespread use in the home and office and are expanding to include the transfer of audio and video between consumer electronic (CE) devices. These LANs include wireless local area networks (WLANs), perhaps the most common of which is based on the well-known IEEE 802.11 or Wi-Fi standards. Other types of WLANs include ultrawideband (UWB) networks that have a fairly short range but very high throughput, and wireless personal area networks (WPANs), such as ZigBee™ and Bluetooth®. Another type of LAN, one that does not use wireless transmission, is a powerline communications (PLC) network that uses the existing electrical wiring in a home or single building, such as a PLC network based on the HomePlug™ standard.

LANs typically include a device that acts as a network controller to connect the network devices together. The network controller may also act as the network's arbitrator, negotiating when network devices can transmit. In an IEEE 802.11 compliant WLAN, the network controller is called the access point (AP). In a PLC network the network controller is called the central controller. In many LANs, there is a need to set up or configure new devices. For example, in an IEEE 802.11 compliant WLAN the configuration information may include a network name or service set identifier (SSID), a channel number, and an optional shared network security key that need to be set in the new device before it can begin to communicate with existing network devices. Typically this configuration information is entered manually into the new device by the user, such as by use of a keypad. For devices without keypads, such as many CE devices like digital televisions (TVs), the configuration process can be difficult and annoying for the user.

In WLANs there is also a desire for secure communication because the wireless transmissions extend beyond the immediate vicinity of the network devices. In some non-wireless LANs, such as PLC networks, secure communication is also desirable because multiple homes or buildings and multiple-residence buildings such as apartment buildings are usually served from a common transformer so that the physical PLC network extends beyond the boundaries of a single residence. Secure communication is especially important in these types of LANs that have CE devices, such as stereo receivers, digital video recorders (DVRs), digital TVs and audio-video (AV) servers, because copyrighted digital audio and video recordings are transmitted over the network.

Secure communication is typically established in these types of non-secure LANs by the use of a shared network security key that is input to a network device during its setup process and used to encrypt and decrypt the transmissions. The shared network security key is stored in all devices that use the encryption method to communicate over the LAN, including the network controller. For example, in an IEEE 802.11 compliant WLAN, the optional shared network security key is based on either the Wired Equivalent Privacy (WEP) or Wi-Fi Protected Access (WPA) encryption standards. In a PLC network based on the HomePlug standard all new devices are shipped with a common publicly-available password that is used to generate a shared network key, but this results in a LAN with non-secure communication. To achieve a secure PLC network configuration, a unique network password must be selected and entered into each device. However, most users do not configure their devices with these security measures because of the inconvenience in configuring the devices with the security key. The user is required to manually enter complex security keys that typically consist of long strings of meaningless characters into multiple devices. The devices may be from various hardware vendors, each having different configuration steps and user interfaces.

Certain systems are commercially available that attempt to reduce the complexity of the configuration process for new LAN devices, and thus encourage the use of security. For example, IEEE 802.11 compliant devices that incorporate the AirStation OneTouch Secure System (AOSS™) from Buffalo Technology are shipped with a common pre-established WEP key and a special button. Activation of the button on the AP and the button on the new device causes the AP to pseudo-randomly generate a new shared network security key and puts the WLAN into a special low-power transmission mode where the AP and the new device can communicate using the common WEP key. The new shared network security key is then transmitted to the new device in the low-power transmission mode. The new device then uses the new shared network security key to communicate with the AP and receive the configuration information in the normal-power transmission mode. The AOSS requires that new devices be manufactured with the AOSS hardware and software, and installed with the common pre-established WEP key.

A method for setting up a new device on an IEEE 802.11 compliant WLAN using a "learning" type of remote control (RC) having both infrared (IR) transmit and receive capability is described in U.S. Published Patent Application US 2004/0203590 A1. In that method the AP and the new device are also equipped with IR transceivers. The RC is placed near the AP and the AP transmits the network WEP key currently in use to the RC via IR. The RC is then placed near the new device and transmits the WEP key to the new device via IR. Once the new device has the WEP key it can communicate with the AP and receive other setup parameters to authenticate and configure the new device. In this method the WEP key remains stored in the RC and is thus non-secure because the RC is a portable non-network device.

What is needed is a LAN with a simple yet secure setup method for new network devices that allows configuration information, including a shared network security key, to be easily and securely transmitted to a new device.

SUMMARY OF THE INVENTION

The invention relates to a system and method for automatically configuring or setting up a new device on a LAN by secure encrypted transmission of setup parameters. A remote control (RC) with an infrared (IR) transmitter contains a stored security number. One of the network devices, typically the network controller, that is already on the network includes a "setup service" that contains the setup or configuration parameters required for a new device to join the network. Setup of a new device is initiated by pressing a single "setup" button on the RC while pointing the IR transmitter of the RC in the general direction of the new device. This button-press causes the microprocessor within the RC to generate a security number and transmit it and a setup command to the new device via IR. The security number is preferably a random number generated by a RNG (also called pseudo-random number generation or PRNG) computer program in the RC. The security number is retained within the RC for only a limited time-out period. The new device receives the setup command and security number, stores the security number in its memory and queries the network for the setup service. Before the time-out period has expired, the IR transmitter of the RC is pointed in the general direction of the network controller, or other network member device that contains the setup service, to transmit the security number to this member device via IR. The RC may transmit the security number to the new device and member device in any order, or to both devices at once. In addition, multiple new devices can be set up within the time-out period. Because a new security number is generated by the RC after the time-out period, each security number is only used during its time-out period and can thus be considered to be a "nonce", i.e., a number that is used only once.

The security number is now a shared security number that is stored in both the member device with the setup service and the new device. The member device with the setup service includes an encryption algorithm that uses the security number as the encryption key. This member device then encrypts a configuration message and transmits it over the network where it can be received by the new device. The encrypted configuration message will include the network configuration parameters, and would include the shared network security key if security of future network transmissions is desired. The new device, which has requested the configuration parameters as a result of the setup command, receives the configuration parameters, including the shared network security key, via secure transmission over the network. The new device includes a decryption algorithm that uses the security number as the decryption key. When the new device receives the encrypted configuration message, it decrypts it and stores the network configuration parameters, including the shared network security key, in nonvolatile memory. The new device is thus configured automatically, without the need for manual input of any network configuration parameters, and is now able to associate with the LAN as a new network member. The shared network security key, which has been transmitted with encryption and only within the LAN, and which now resides only in member devices, is used by the new device, thereby insuring that all future network transmissions are secure. Once the new member has joined the network and can engage in secure communication, the security number is no longer needed and can be erased from memory in the member devices.

For a fuller understanding of the nature and advantages of the present invention, reference should be made to the following detailed description taken together with the accompanying figures.

DETAILED DESCRIPTION OF THE INVENTION

Figure 1:
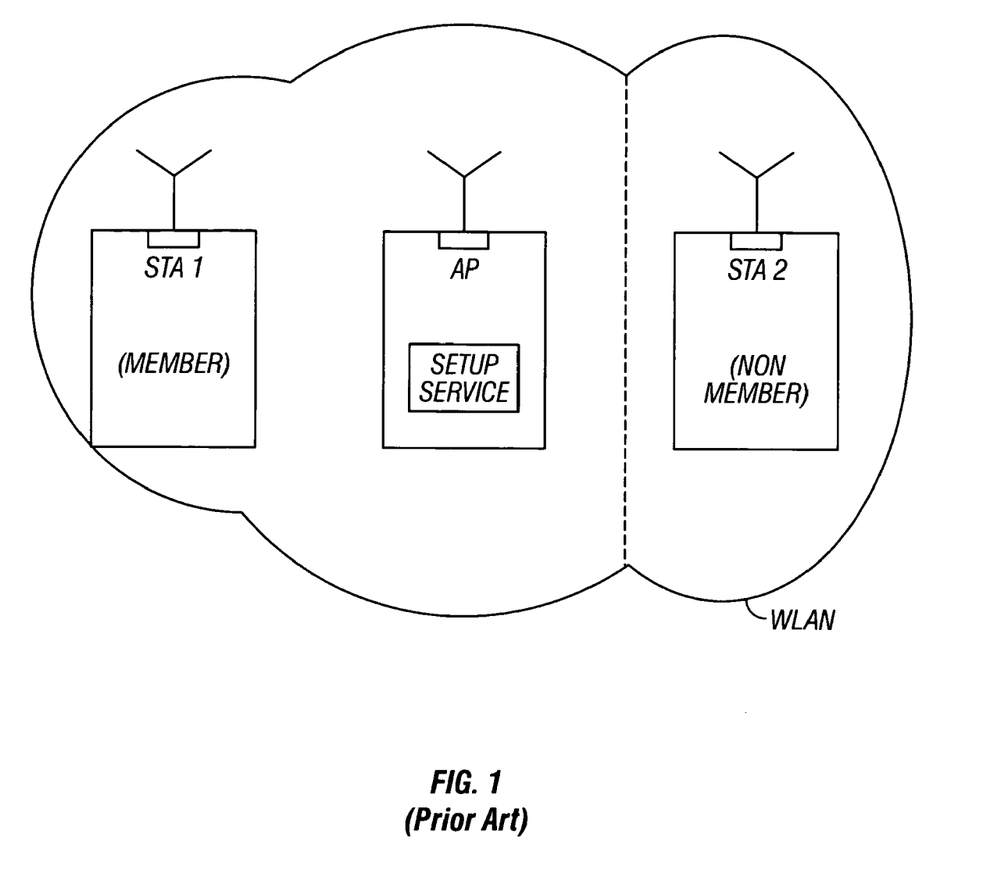
FIG. 1 is a block diagram of an IEEE 802.11 compliant WLAN for illustrating the prior art method of setting up or configuring a new device.

The invention will be described with respect to an IEEE 802.11 compliant WLAN, but the invention is fully applicable to other types of WLANs and to non-wireless LANs such as PLC networks. FIG. 1 is a high-level block diagram of an IEEE 802.11 compliant WLAN for illustrating the prior art method of setting up or configuring a new device. The WLAN includes the AP with the pre-installed setup service, a member device or station (STA 1) already connected and authenticated on the WLAN, and a nonmember device (STA 2) to be configured for connection to the WLAN and shown by the dashed line in FIG. 1 as not yet being part of the WLAN. Each of the AP, STA 1 and STA 2 devices is equipped with an IEEE 802.11 transceiver. The devices are typically personal computers (PCs), computer peripheral devices such as printers and storage devices, and consumer electronic (CE) devices such as stereo receivers, digital video recorders (DVRs) and digital TVs. One of the devices may also be an audio-video (AV) server, which is typically a PC, DVR or similar device with a hard disk drive (HDD) that stores the audio and/or video content or a satellite TV or cable TV set-top converter.

To set up STA 2 for connection to the WLAN certain network configuration parameters that match the parameters in the AP setup service must be input to STA 2. For an IEEE 802.11 compliant WLAN these parameters would include the network name (SSID), the wireless channel number, the wireless mode (e.g., 802.11b, 802.11g), a security option (e.g., WEP, WPA or none), and a shared network security key (e.g., a WEP key or WPA key) if a security option is selected. The conventional manner for inputting these parameters is manually with a keyboard or keypad associated with the new device (STA 2). Once these parameters have been input the new device can communicate with the AP and other member devices. If no security option has been selected, usually because the user is not motivated to manually enter a long string of mixed numbers and letters, then all wireless transmissions will be non-secure.

In the present invention the user automatically sets up a new device on the LAN by simply pressing a single "setup" button on a remote control (RC) while pointing the IR transmitter of the RC in the general direction of the new device. This button-press causes the microprocessor within the RC to generate a security number and transmit it and a setup command to the new device via IR. The security number is preferably a random number. The security number is retained within the RC for only a limited time-out period. The new device receives the setup command and security number, stores the security number in its memory and queries the network for the setup service. Before the time-out period has expired, the IR transmitter of the RC is pointed in the general direction of the AP or other member device that contains the setup service to transmit the security number to this member device via IR. The RC may transmit the security number to the new device and member device in any order, or to both devices at once. In addition, multiple new devices can be set up within the time-out period. Because a new security number is generated by the RC after the time-out period, each security number is only used during its time-out period and can thus be considered to be a "nonce", i.e., a number that is used only once.

The security number is now a shared security number that is stored in both the member device with the setup service (the AP) and the new device. The member device with the setup service includes an encryption algorithm that uses the security number as the encryption key. This member device then encrypts the configuration message and transmits it over the network where it can be received by the new device. The encrypted configuration message will include the network setup parameters, and would include the shared network security key if security of future network transmissions is desired. The new device, which has requested the configuration parameters as a result of the setup command, receives the configuration parameters, including the shared network security key, via secure transmission over the network. The new device includes a decryption algorithm that uses the security number as the decryption key. When the new device receives the encrypted configuration message, it decrypts it and stores the network configuration parameters, including the shared network security key, in nonvolatile memory. The new device is thus configured automatically, without the need for manual input of any network configuration parameters, and is now able to associate with the LAN as a new network member. The shared network security key, which has been transmitted with encryption and only within the LAN, and which now resides only in member devices, is used by the new device, thereby insuring that all future network transmissions are secure. Once the new member has been associated with the network, the security number is no longer needed and can be erased from memory in the member devices.

Figure 2:
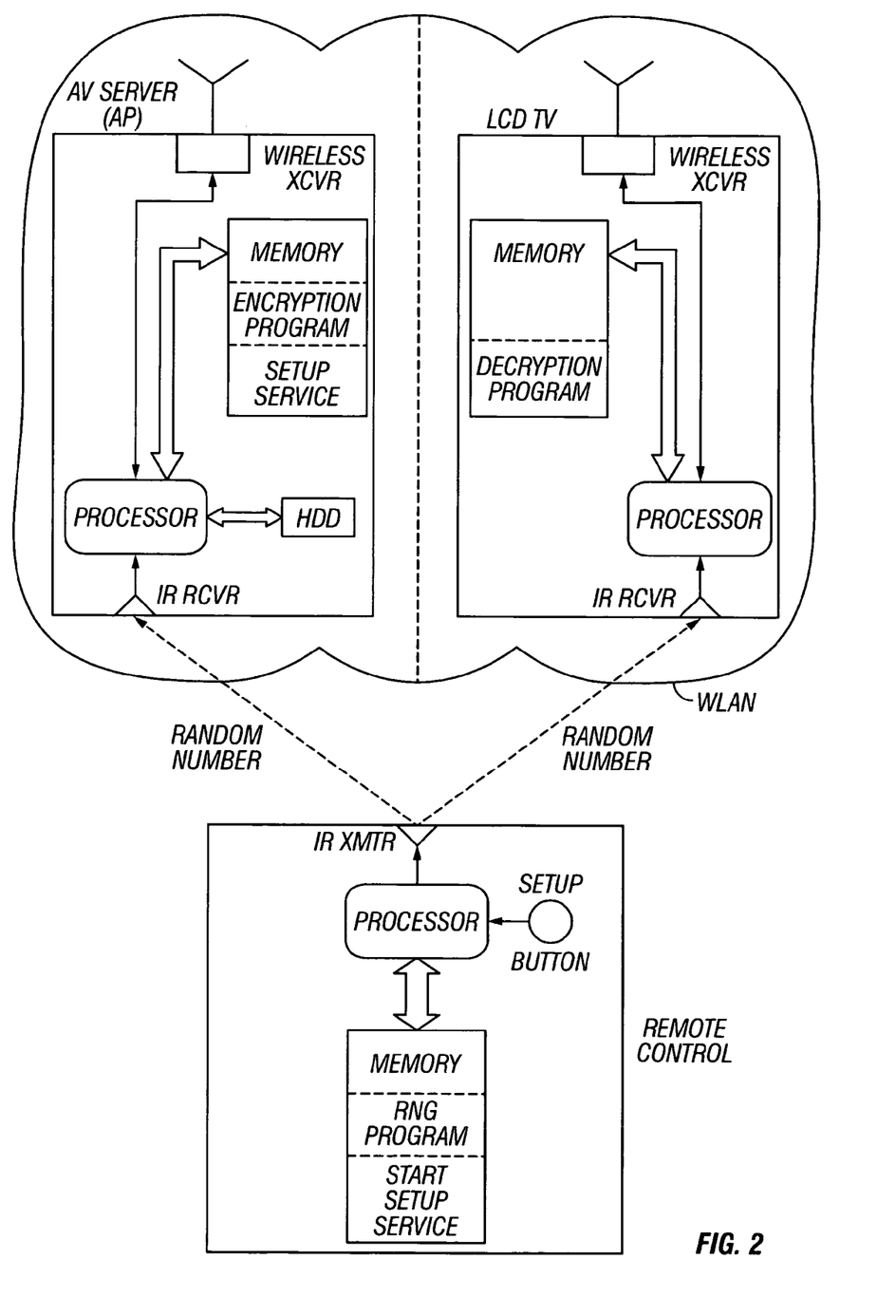
FIG. 2 is a block diagram of an IEEE 802.11 compliant WLAN according to the present invention showing the network devices and a remote control for transmitting a security number to the network devices via infrared (IR).

FIG. 2 is a high-level block diagram of an IEEE 802.11 compliant WLAN according to the present invention and will be used to describe the method for configuring a new device. The WLAN will be described by way of example as a home network for transfer of audio and/or video content between CE devices. The WLAN thus includes an audio and/or video (audio-video or AV) server as the AP or member device with the setup service stored in memory, and a liquid-crystal display (LCD) digital TV as the nonmember device. The AV server may by a PC, DVR or similar device with a hard disk drive (HDD) for storing the audio and/or video content or a satellite TV or cable TV set-top converter. Only two devices are shown in FIG. 2, but the WLAN may include additional devices, such as additional TVs and a stereo receiver for playing audio content.

Each of the network devices includes an IEEE 802.11 wireless transceiver for network communication, an IR receiver or transceiver, a processor (e.g., a microprocessor or microcontroller), memory accessible to the processor, and an encryption/decryption computer program stored in memory. The IEEE 802.11 wireless transceiver and IR receivers or transceivers are conventional commercially-available components used in CE devices. The encryption/decryption computer program may implement any well-known encryption/decryption algorithm, such as the publicly-available National Institute of Standards and Technology (NIST) advanced encryption standard (AES) algorithm, that uses a secret encryption key to encrypt and decrypt a data stream. The member device, which in the example of FIG. 2 is an AV server, also contains the network configuration parameters in the setup service stored in memory.

FIG. 2 also illustrates the RC associated with the WLAN. The RC includes a conventional IR transmitter (or optionally an IR transceiver), a processor with associated memory, and a setup button. The RC memory includes a stored computer program that implements a random-number generation (RNG) algorithm, and a "start-setup" code or number that serves as the setup command. The RC may be a conventional RC, such as those shipped with CE devices, that has one of its buttons programmed or designated as the setup button and that has the start-setup code and RNG program stored in memory. The RC is not a network device but transmits information outside the network to the network devices via IR.

Figure 3A:
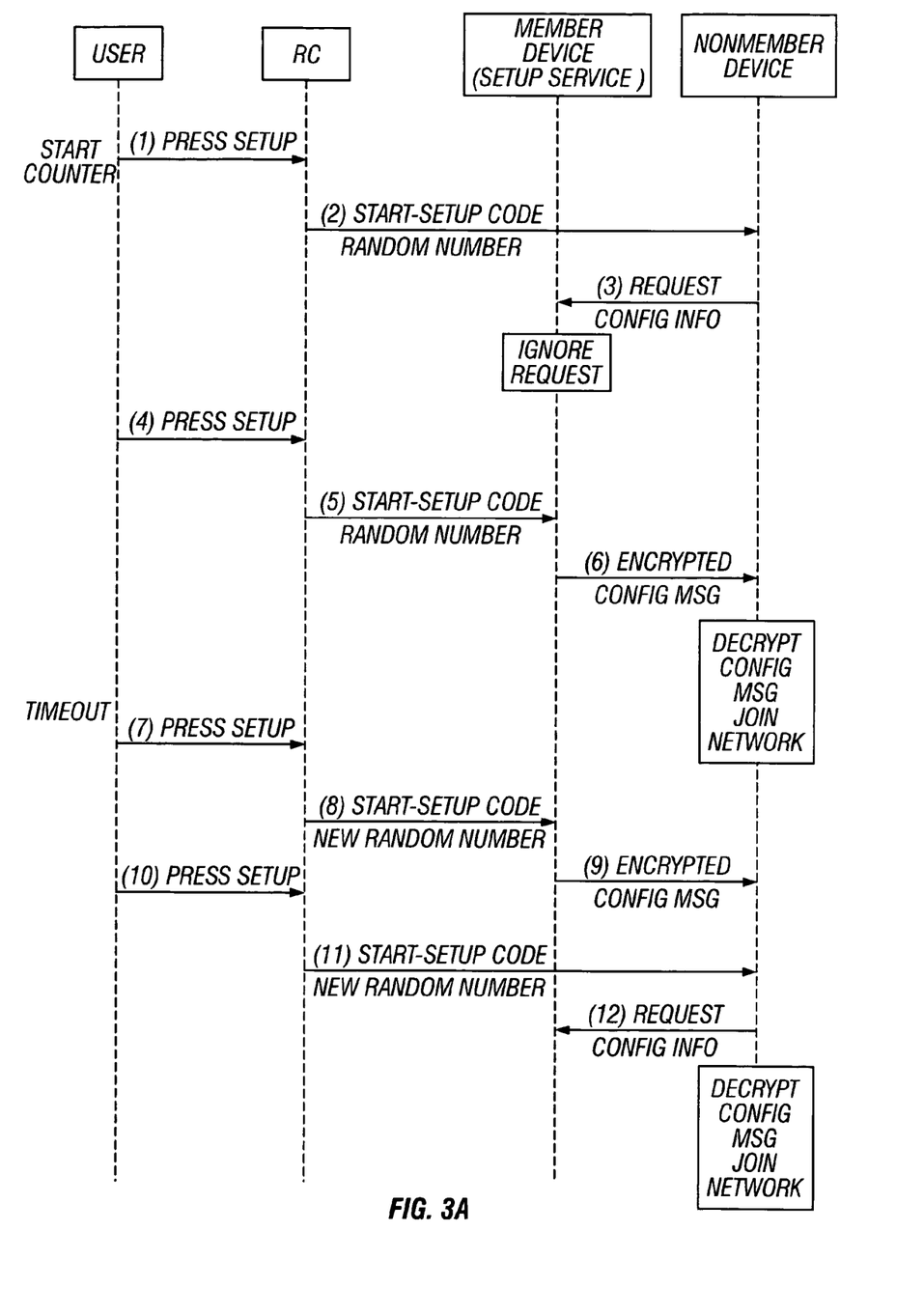
FIG. 3A is a message sequence chart showing the setup method wherein the nonmember device is the first device to receive the setup command and the random number (called the security number) from the remote control.

FIG. 3A is a message sequence chart showing the setup method wherein the nonmember device (the TV) is the first device to receive the setup command and the random number from the RC. Network configuration or setup of the TV is initiated when the RC is pointed in the direction of the TV's IR receiver and the RC setup button is pressed (1). This powers up the RC processor, which then identifies the setup button that has been pressed and initiates the instructions associated with it. The RC processor then runs the RNG program, stores the random number in memory, initiates a clock or counter, recalls the start-setup code from memory and transmits the start-setup code and the random number to the RC's IR transmitter where it is sent via IR to the TV's IR receiver (2). The random number has a bit length to match the encryption key bit-size used by the encryption/decryption program in the network devices. For example, the previously-described AES algorithm supports encryption key sizes of 128, 192 and 256 bits. The start-setup code may be a simple sequence of bits appended as a preamble to the random number. In another technique, the command associated with the setup button can be defined to take a parameter, with the random number being inserted into the parameter field.

When the processor in the TV receives the start-setup code and random number from its IR receiver, it stores the random number in memory and queries the WLAN (through its wireless transceiver) to request the setup service containing the configuration information from the AV server (3). However, because the AV server has not yet received the security number from the RC the AV server ignores the request.

Next, the RC is pointed in the direction of the IR receiver on the AV server and the RC setup button is pressed (4). If this occurs while the RC processor is continuing the counter, i.e., before the counter has timed out, then the same method as described above occurs, resulting in the start-setup code and random number being transmitted to the AV server's IR receiver via IR (5).

When the AV server's processor receives the start-setup code and random number from its IR receiver within the time-out period (5), it stores the random number in memory, recalls the configuration parameters from the stored setup service and runs the encryption algorithm on the configuration parameters using the random number as the encryption key. This generates an encrypted configuration message that is then broadcast on the WLAN via the AV server's wireless transmitter (6). The encrypted configuration message may include the shared network security key, e.g., the WEP key or WPA key. The TV (the nonmember device), which is requesting the setup service (3) as a result of the start-setup code (2), now detects the encrypted configuration message, recalls the previously-stored random number and uses it as the decryption key to decrypt the configuration message. The TV has now joined the network and can communicate in a secure manner using the shared network security key.

If the time-out period has been reached when the RC's setup button is pressed (7) to transmit the setup command and random number to the AV server, then in one technique the random number is erased from the RC's memory and no transmission to the AV server occurs. The setup method of FIG. 3A must then be re-initiated at the TV, with a new random number being generated and transmitted to the TV (2). In a different technique, if the setup button is pressed after the time-out period (7), the RC will generate a new random number and transmit the start-setup code and the new random number to the AV server (8). In this technique, the initial setup try will have failed because the time-out has expired but the AV server will now be the first device to receive the start-setup code and new random number. The AV server will then transmit the encrypted configuration message to the TV (9). The RC is then pointed in the direction of the TV's IR receiver and the RC setup button is pressed (10) to transmit the start-setup code and the new random number to the TV (11). This causes the TV to store the new random number in its memory and query the WLAN to request the configuration information (12). The TV detects the encrypted configuration message being transmitted recalls the previously-stored new random number and uses it as the decryption key to decrypt the configuration message. The TV has now joined the network and can communicate in a secure manner using the shared network security key.

The use of the time-out period in the RC increases the security of the setup process by assuring that the random number is not likely to be recovered at a later time. The length of the time-out period is preferably relatively short, e.g., several minutes. In one technique the time-out period is a predetermined default period based on an estimate of how long a typical user would need when network devices are located in different rooms. In another technique the time-out period can be adjusted by the user by pressing one or more other buttons on the RC. In still another technique the RC's processor can restrict the random number to be transmitted only twice, so that the "time-out" period ends with the second transmission, thus assuring that the random number is used only once for each new device.

The configuration parameters from the decrypted configuration message, including the shared network security key, are then stored in nonvolatile memory in the nonmember device. This results in the nonmember device being automatically setup as a new member device on the WLAN, complete with the shared network security key. The new member device can now associate with the network and communicate with all other network devices in a secure manner. For an IEEE 802.11 compliant WLAN, in addition to the shared network security key (WEP key or WPA key), the network configuration parameters would also include the network name (SSID), the wireless channel number, and the wireless mode (e.g., 802.11b, 802.11g). Additional parameters may include the Internet Protocol (IP) address, the Default Gateway, the sub-network mask, and authentication keys used by applications such as DTCP/IP.

Figure 3B:
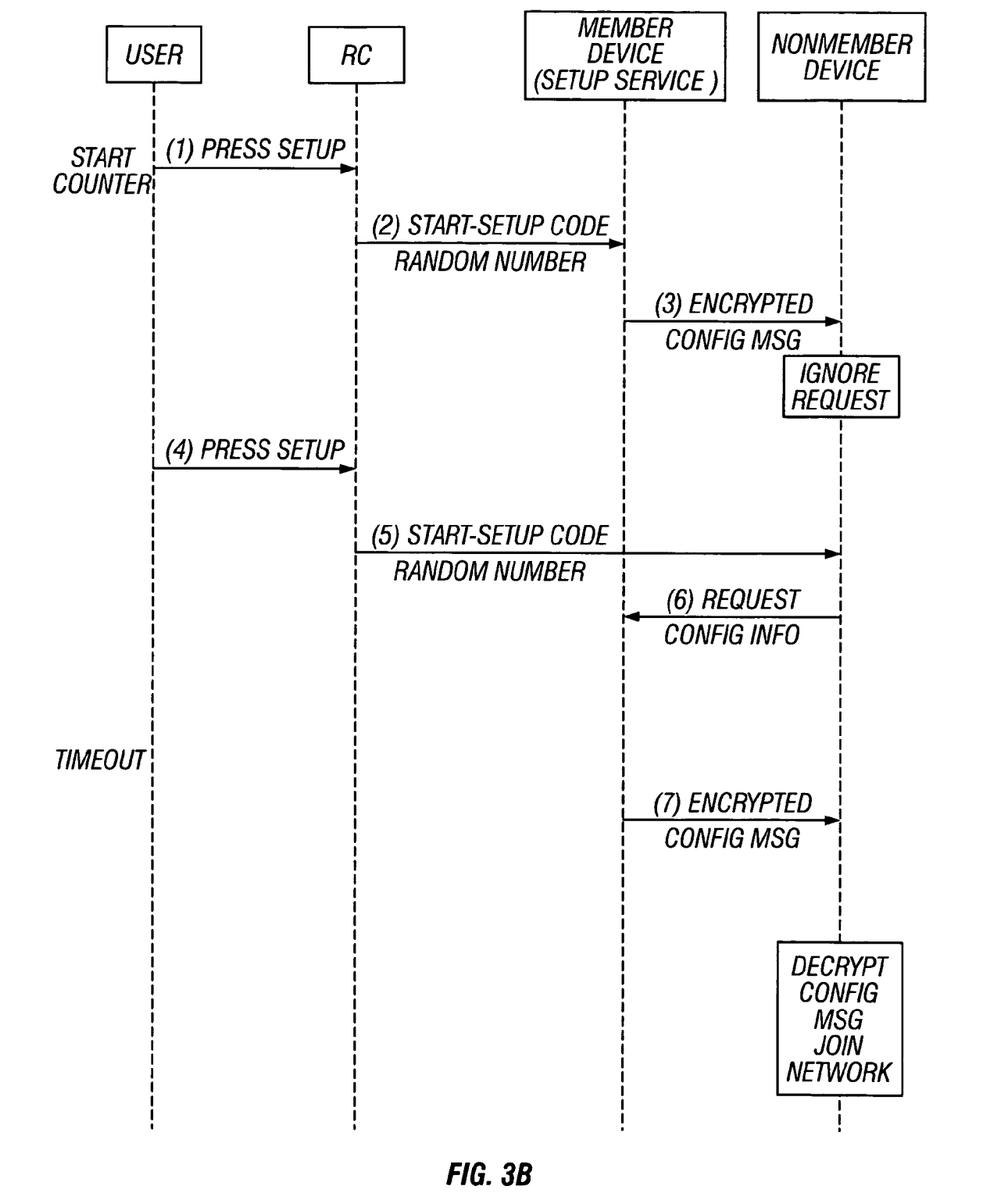
FIG. 3B is a message sequence chart showing the setup method wherein the member device is the first device to receive the setup command and the random number from the remote control.
Figure 3C:
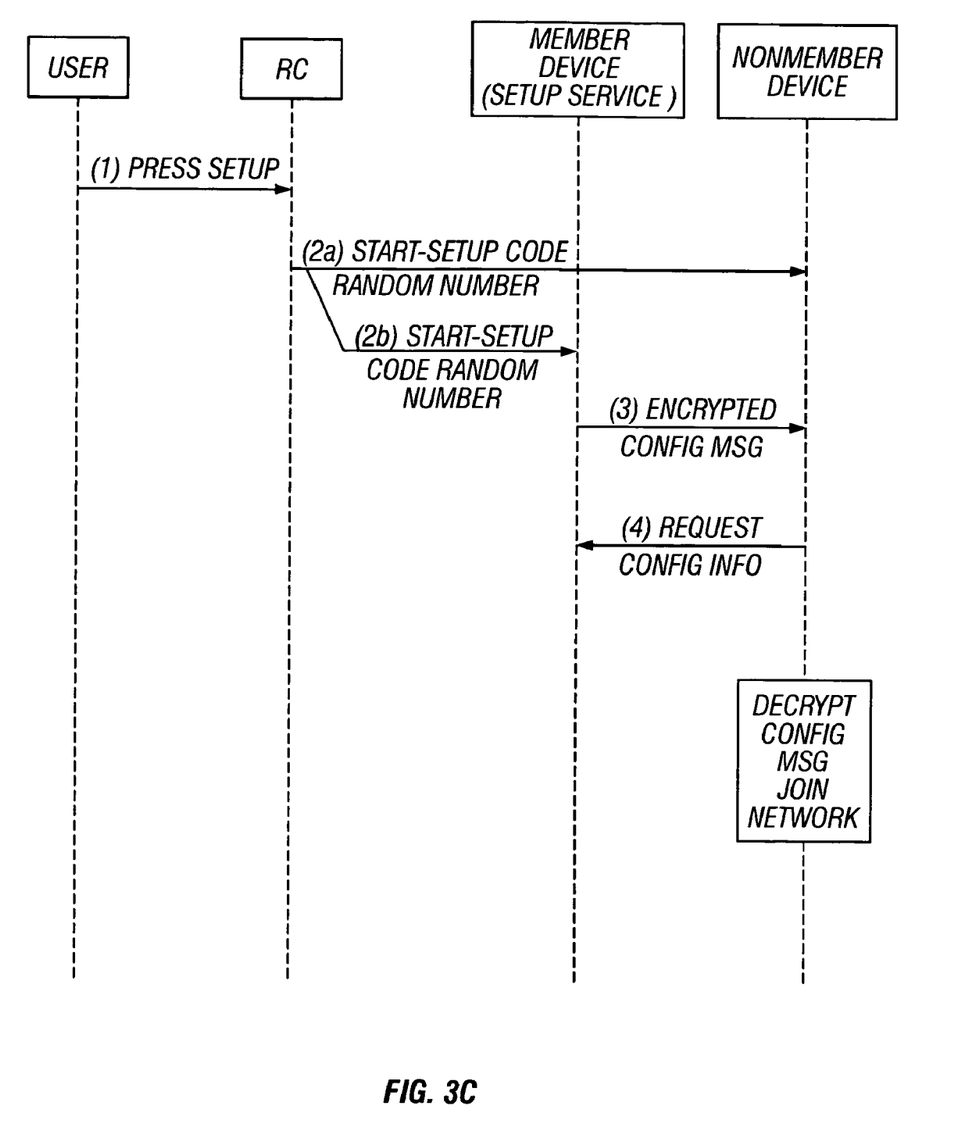
FIG. 3C is a message sequence chart showing the setup method wherein the nonmember device and the member device receive the setup command and the random number from the remote control at the same time.

The method has been described above and illustrated in FIG. 3A with the nonmember device being the first device to be enabled for setup. However, the devices can be enabled for setup in any order, or simultaneously if the RC's IR transmitter is within range of the IR receiver on more than one device when its setup button is pressed. FIG. 3B is a message sequence chart showing the setup method wherein the member device is the first device to receive the setup command and the random number from the RC. FIG. 3C is a message sequence chart showing the setup method wherein the nonmember device and the member device receive the setup command and the random number from the RC at the same time. In the method of FIG. 3C the order in which the devices act upon the start-setup code and random number from the RC is indeterminate. However, regardless of the actual order that messages (3) and (4) are transmitted, the nonmember device is able to decrypt the encrypted configuration message and join the network to communicate in a secure manner using the shared network security key.

As described above, in one embodiment the security number is a random number generated by a RNG algorithm (also called pseudo-random number generation or PRNG algorithm). A PRNG algorithm generates a sequence of numbers, the elements of which are approximately independent of each other. The random number may also be generated from a table of random numbers stored in the RC's memory. The random number is generated when a single setup button is pressed on the RC. This has the advantage that the user is not required to select a security number or a button to press. User-selected numbers and user-selected buttons result in inherently weak security numbers because users tend to pick common numbers and buttons. However, the security number does not need to be such a purely or truly random or pseudo-random number. For example, the security number can be generated or selected "randomly" or arbitrarily by other methods, such as by pressing an arbitrary button or sequence of buttons on the RC, with the button or button sequence identifying a memory location containing a previously stored security number from a large set of security numbers. While such methods are less secure than a random-number generation algorithm for the reasons explained above, the fact that the security number is a nonce reduces the risk that a security number generated by these other methods can be compromised.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A system for configuring a consumer electronic device on a local area network (LAN) comprising:
    a remote control comprising a processor, a first computer program of instructions executable by the processor for generating a security number, memory coupled to the processor for storing said first computer program and said security number, a setup button for initiating generation of said security number by said first computer program of instructions, and an infrared (IR) transmitter for transmitting said security number;
    a network member device comprising a processor, memory coupled to the processor, and an encryption computer program responsive to said security number transmitted by the remote control for encrypting a network configuration message transmitted on the local area network; and
    a consumer electronic device for connection to the network comprising a processor, memory coupled to the processor, and a decryption computer program responsive to said security number transmitted by the remote control for decrypting the encrypted network configuration message transmitted by the network member device.

2. The LAN of claim 1 wherein said security number is stored in the memory of the remote control only for a time-out period.

3. The LAN of claim 1 wherein said first computer program is a random number generation program and wherein said security number is a random number.

4. The LAN of claim 3 further comprising a table of random numbers stored in the memory of the remote control and wherein said random number generation program generates said security number from said table.

5. The LAN of claim 1 wherein said encryption computer program includes instructions for deleting said security number from memory of the network member device after the network configuration message has been encrypted.

6. The LAN of claim 1 wherein said decryption computer program includes instructions for deleting said security number from memory of the consumer electronic device after the network configuration message has been decrypted.

7. The LAN of claim 1 wherein said setup button also causes a start-setup code to be transmitted to the consumer electronic device to ready the consumer electronic device for receipt of the network configuration message transmitted by the network member device.

8. The LAN of claim 1 wherein said encryption computer program and said decryption computer program include instructions for performing the advanced encryption standard (AES) algorithm and said security number comprises the AES algorithm key.

9. The LAN of claim 1 wherein the LAN is a powerline communications (PLC) network.

10. The LAN of claim 1 wherein the LAN is a wireless local area network (WLAN), wherein said network member device and said consumer electronic device each includes a wireless transceiver, and wherein the network configuration message is broadcast on the WLAN by the member device.

11. The WLAN of claim 10 wherein the WLAN is a IEEE 802.11 type WLAN, and wherein the network configuration message includes a security key.

12. A method for setting up a consumer electronic device on a local area network (LAN) having a network member device containing network setup parameters, the method comprising:
in an infrared (IR) remote control having a processor and a stored computer program of instructions executable by the processor for generating a security number, initiating the operation of said computer program to thereby generate the security number within the remote control;
storing said security number in the remote control for a time-out period;
before expiration of the time-out period, transmitting said security number from the remote control to the consumer electronic device and the network member device via IR transmission;
storing said security number in the consumer electronic device;
storing said security number in the network member device;
readying the consumer electronic device for receipt of encrypted network setup parameters transmitted on the network;
encrypting the network setup parameters in the network member device using said security number as the encryption key;
transmitting on the local area network the encrypted network setup parameters;
decrypting the encrypted network setup parameters in the consumer electronic device using said security number as the decryption key; and
storing the decrypted network setup parameters in the consumer electronic device.

13. The method of claim 12 wherein said security number is a random number.

14. The method of claim 12 wherein storing said security number in the remote control for a time-out period comprises storing said security number for a time-out period corresponding substantially to the time between a first transmission of said security number and a second transmission of said security number.

15. The method of claim 12 wherein the LAN is an IEEE 802.11 type wireless local area network (WLAN), and wherein the encrypted network setup parameters include a security key.

16. The method of claim 12 wherein transmitting said security number to the network member device comprises transmitting the security number to the network member device and the consumer electronic device simultaneously.

17. The method of claim 12 further comprising, if the time-out period has expired:
generating a new security number in the remote control;
storing the new security number in the remote control for said time-out period;
transmitting from the remote control to the network member device and the consumer electronic device via infrared (IR) transmission said new security number;
storing said new security number in the network member device;
storing said new security number in the consumer electronic device;
encrypting the network setup parameters in the network member device using said new security number as the encryption key; and
transmitting on the local area network the encrypted network setup parameters.

* * * * *